United States Patent [19]
Borse

[11] Patent Number: 5,344,716
[45] Date of Patent: Sep. 6, 1994

[54] METHOD OF PRODUCING METALLIC SINTER BODIES, AS WELL AS SINTER BODY IN PARTICULAR PRESSING TOOL

[75] Inventor: Dietrich Borse, Hamburg, Fed. Rep. of Germany

[73] Assignee: Firma Ernst Winter & Sohn GmbH & Co., Hamburg, Fed. Rep. of Germany

[21] Appl. No.: 927,854

[22] Filed: Aug. 10, 1992

[30] Foreign Application Priority Data

Aug. 8, 1991 [DE] Fed. Rep. of Germany ....... 4126211
Jan. 3, 1992 [DE] Fed. Rep. of Germany ....... 4200065

[51] Int. Cl.$^5$ .................................................. H01F 3/02
[52] U.S. Cl. .................................... 428/566; 428/546; 419/44

[58] Field of Search ................... 18/16.5; 29/182, 189, 29/420.5; 75/214; 106/38.6, 40 R; 419/5, 28, 44; 428/188, 328, 545, 558, 566, 546

[56] References Cited

U.S. PATENT DOCUMENTS

| | | | |
|---|---|---|---|
| 2,751,293 | 6/1956 | Haller | 75/214 |
| 3,751,271 | 8/1973 | Kimura et al. | 106/40 R |
| 3,852,045 | 12/1974 | Wheeler et al. | 29/182 |
| 4,698,205 | 10/1987 | Oskarsson | 419/5 |
| 4,769,212 | 9/1988 | Nakamura et al. | 419/28 |

Primary Examiner—Donald P. Walsh
Assistant Examiner—John N. Greaves
Attorney, Agent, or Firm—Michael J. Striker

[57] ABSTRACT

In accordance with a method of producing metal sinter bodies, the bodies are provided with degassing openings which are made preferably before sintering of an initial press body part.

14 Claims, 5 Drawing Sheets

METHOD OF PRODUCING METALLIC SINTER BODIES, AS WELL AS SINTER BODY IN PARTICULAR PRESSING TOOL

BACKGROUND OF THE INVENTION

The present invention relates to a method of producing large sinter bodies of hard alloy (hard metal). More particularly, it relates to a method of producing hard alloy plungers and hard alloy matrixes which are used as pressing tools for the ultrahigh pressure synthesis of diamonds or cubic boron nitride as well as for the ultrahigh pressure sintering of polychrystalline diamond or polychrystalline cubic boron nitride.

Such hard alloy plungers and hard alloy matrixes are substantial components of the "belt" or "girdle" pressing apparatus. Other ultrahigh pressure pressing apparatuses are designed in accordance with the multiple plunger principle. They require no matrix. For example, the tetraeder pressing apparatus has four plungers and the cubic pressing apparatus has six plungers. In these pressing apparatuses the shape of the plunger is similar to the shape of the plungers in the above mentioned pressing apparatuses. Instead of truncated cones, they have a truncated triangular pyramid or a truncated square pyramid.

The production of hard alloy plungers and matrixes for smaller apparatuses which are sufficient for experimental synthesis does not pause significant problems in the prior art. For the industrial production of diamonds and cubic boron nitrides or for the above mentioned polychrystalline products, increasing greater pressing apparatuses are required with correspondingly greater plungers and matrixes.

They deal with plungers having a diameter of the pressing surface greater than 40 mm, a diameter of the basic surface greater than 80 mm, and a height greater than 60 mm. Correspondingly, the matrixes have the inner diameter greater than 40 mm, the outer diameter greater than 120 mm, and the height greater than 60 mm. Since the development of greater ultrahigh pressure pressing apparatuses has been maintained, an upper limit of the dimensions of such hard alloy plungers and matrixes at this time is not conceivable.

A typical example for large plunger and matrix are the plunger with a diameter of a pressing surface of 120 mm, the diameter of the basic surface 240 mm, and the height 180 mm. The corresponding matrixes have an inner diameter of approximately 120 mm, an outer diameter of approximately 360 mm, and a height of 120 mm. The greater the plunger and matrixes, the more problematic is the sintering process for their production.

Production of hard alloy parts formed by pressing and sintering of powder mixtures composed of hard carbide and binding metal. Plungers and matrixes for the ultrahigh pressure technique are preferably produced from mixtures of tungsten carbide and cobalt as binding metal.

The initial powders have fine grains, and by joint wet milling are further comminuted and thoroughly mixed. Subsequently, the powder mixture for the pressing process is prepared by granulation. For this purpose a granulating medium is utilized, which conventionally is composed of paraffin or wax and has a fraction of approximately 0.5 weight percent—2 weight percent. The pressing of larger "green products" (raw bodies) is performed preferably in a rubber form with a pressure of 100–200 MPa in cold isostatic pressing processes. By shaping for correcting the mass can be performed by material removal, during which the shrinking (linearly approximately 20%) produced during sintering is taken into consideration. In many cases however the shaping machining is performed after the presintering.

The presintering of the pressing parts is performed with increasing temperature. The end temperature amounts to approximately 970 K.–1,170 K. in a first part of the presintering, in the temperature region up to approximately 700 K the granulating binding medium is evaporated ("degrowth"). The gases (CO, $CO_2$, $H_2O$, $CH_4$) which escape in subsequent higher temperature region of the presintering, are produced under the alternating action of residual metal oxide with the carbon fraction and the oven atmosphere in the sinter body.

At the end of presintering, the sinter body has fine pores, and is significantly pure, or in other words it is released from steam or gas emitting residues.

Due to the presintering there is no high sintering shrinkage. The parts can be however well handled and mechanically worked to achieve the predetermined final dimensions in correspondence with the expected total shrinkage during subsequent sintering process per se.

The final sintering of the hard alloy parts is performed in a hydrogen atmosphere or preferably in vacuum. During temperature increase to the end temperature, a liquid phase occurs depending on the hard alloy type, or in other words depending on the composition and desired structure, and between 1,600 K. and 1,900 K. It finally leads to pore-free or almost pore-free tight sintering.

The production sequence of the hard alloy sintering which has been described above is only exemplary and typical for the production of plungers and matrixes for the ultrahigh pressure technique.

A critical part of the process for producing the above mentioned large hard metal parts is the presintering, especially the degrowing and the degassing. Moreover, it is also true for the first portion of the final sintering in which the open pores still exist so that many reactive gases can reach them or the pores must be released from gases by vacuum.

The driving out of the wax or paraffin fractions the reactive gas exchange and the degassing must be performed in the large sinter bodies with fine-grain, substantially precompressed pressing structure over relatively long, multiple branched and very narrow passages. These conditions in small sinter bodies are relatively favorable due to the short path from the interior to the outer surface and do not pause substantial problems. In large sinter bodies there are however long passages which are not favorable. The time for the intermediate temperatures of the presintering must be therefore extended over proportionally to the size of the parts. The danger that despite the increased time for the degrowing, composition residues remain and lead to false carbon content or during the evaporation of the growth residues for forming pores increases with the size of the sinter cross-section. Moreover, the conditions for the reduction of residual oxides are unfavorable since the hydrogen supply and the deviation of the gaseous oxidation products are significantly hindered. Finally, the degassing of the pores performed by the outwardly acting vacuum is hindered in the interior of great cross-sections.

Since the large hard alloy sinter parts are provided for extreme loads so that in their maximum stressed cross-sections the elasticity region is more or less exceeded, the smallest quality or strength reduction influences their technical loading ability and thereby is decisive for their operational reliability.

SUMMARY OF THE INVENTION

Accordingly, it is an object of the present invention to provide a method of producing metallic sinter bodies, and a sinter body produced thereby, which avoids the disadvantages of the prior art.

More particularly, it is an object of the present invention to provide a method in accordance with which the above described problems of the gas exchange and the evaporation are eliminated or at least reduced by improving the sintering process.

In order to achieve these objects in accordance with the present invention prior to presintering or prior to the final sintering the sinter body is provided with one or several passages for vapor and gas, so that the degrowing, the gas exchange and the evacuation are hindered substantially less.

Since the outer surfaces of the sinter bodies in the region of their maximum load must not be interrupted by openings and the maximum loaded cross-section must not be reduced by passages, openings, holes and thereby weakened, the passages in accordance with the present invention extend from less loaded surfaces through less loaded cross-section to the maximum loaded cross-section. The passages can be formed as blind holes or pocket openings such, and also as throughgoing passages and openings.

Preferably, the passages are provided after the pressing and before the presintering. Thereby the process of degrowing is favorable.

The degassing passages can be arranged in different manner. Length, trajectory and cross-section of the passages can be selected in many different ways.

The degasifying channels can be formed after the pressing of the sinter body. In particular, corresponding holes can be drilled with a metal drill.

On the other hand, the passages can be produced during pressing. For this purpose pins, bars or wires can be inserted in the powder filling of the pressing mold and pressed in this position. After the pressing of the sinter body the above parts are removed. Advantageously, cylindrical or conical bars of metal or plastic are utilized. Wires can used for especially thin passages.

When the bars are formed of wax they do not have to be mechanically removed after the pressing, since during the presintering they are evaporated. Bars composed of pore material with coarse pores such as for example aluminum oxide or hard alloy presintered with coarse pores, can be used in some cases as gas passages. They also do not have to be removed after the presintering.

The openings which remain in the final sinter metal body do not cause any disadvantages. When such openings are not desired for special technical reasons, they can be closed substantially by pressing, soldering or glueing of bars, pins or powder of metal or other materials. When for example no fluids or impurities must reach the passages, they can be closed with casting resin.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
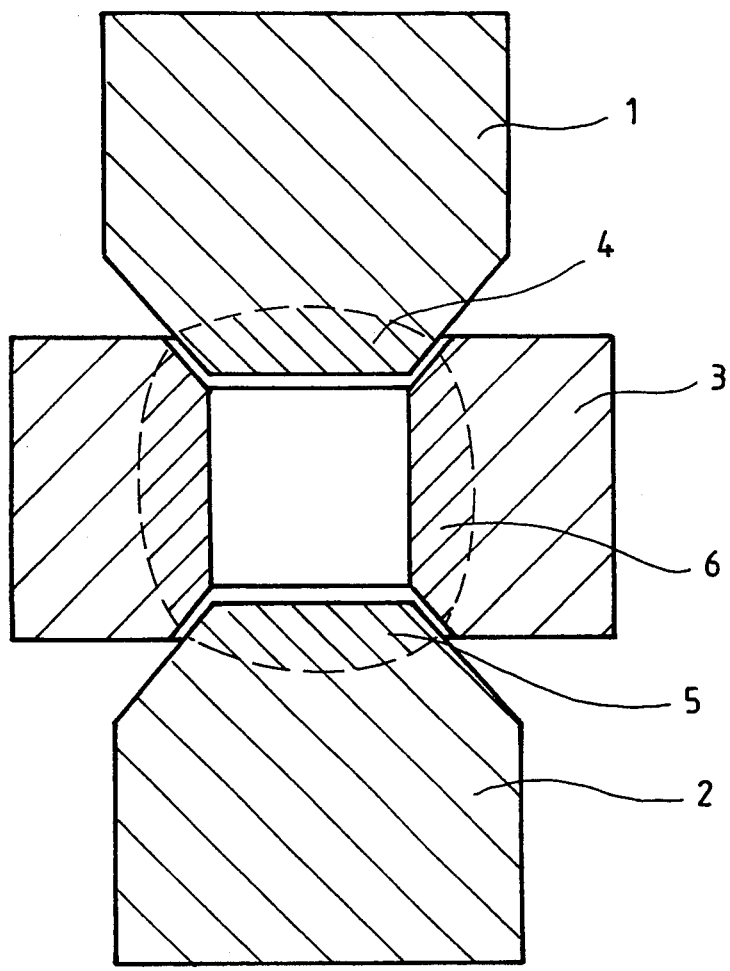
FIG. 1 is a view showing a matrix with two plungers for performing a known method.

FIG. 1 schematically shows a pressing apparatus with two plungers 1 and 2 and a matrix 3. The apparatus is used for ultrahigh pressure synthesis of diamonds as well as for the ultrahigh pressure sintering of polychrystalline diamonds. The plungers 1 and 2 as well as the matrix 3 are extremely highly loaded in the circled regions 4, 5 and 6 of their cross-sections. They are subjected to an unusually high pressure of over 4.0 GPa and additionally to temperatures of over 500 K. These very high loads act on the outer surfaces which surround the reaction chamber and the cross-sections located under it in the plungers 1 and 2 and the matrix 3.

The plungers 1 and 2 and the matrix 3 are formed as hard alloy bodies produced in a sintering process. For avoiding problems during the production of the tool or sintering the tool with optimal conditions, the tools are provided with degassing openings or degassing passages which are identified in the drawings with reference numeral 8.

Figure 2:
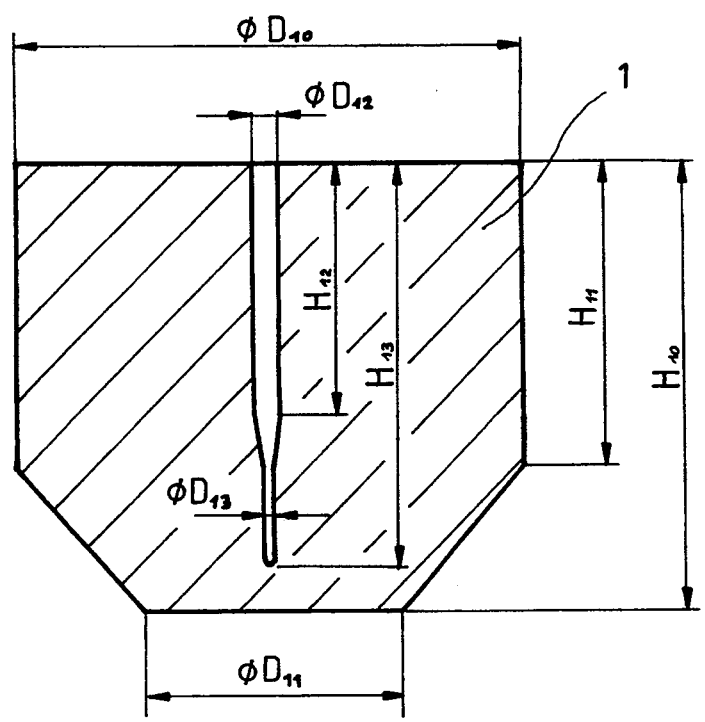
FIGS. 2–5 are views showing plungers for performing the inventive method in accordance with several embodiments of the present invention.

FIG. 2 shows a plunger which is provided with only one unloading opening. The opening extends concentrically from the upper side of the plunger in direction toward its plunger surface and narrows in a lower portion. This degassing passage extends thereby from a less loaded cross-section surface of the plunger in direction to a higher loaded cross-section surface, in which the passages has a smaller diameter $D_{13}$.

The plunger 1 has a total height $H_{10}$, which includes the height $H_{11}$ of its cylindrical part and the height of its subsequent conical part. The total diameter or the outer diameter is identified as $D_{10}$ and the diameter of the pressing surface is identified as $D_{11}$. The single degassing passage has a diameter of $D_{12}$ in the region of its height $H_{12}$ and a diameter $D_{13}$ in the remaining portion of the total height $H_{13}$.

Figure 3:
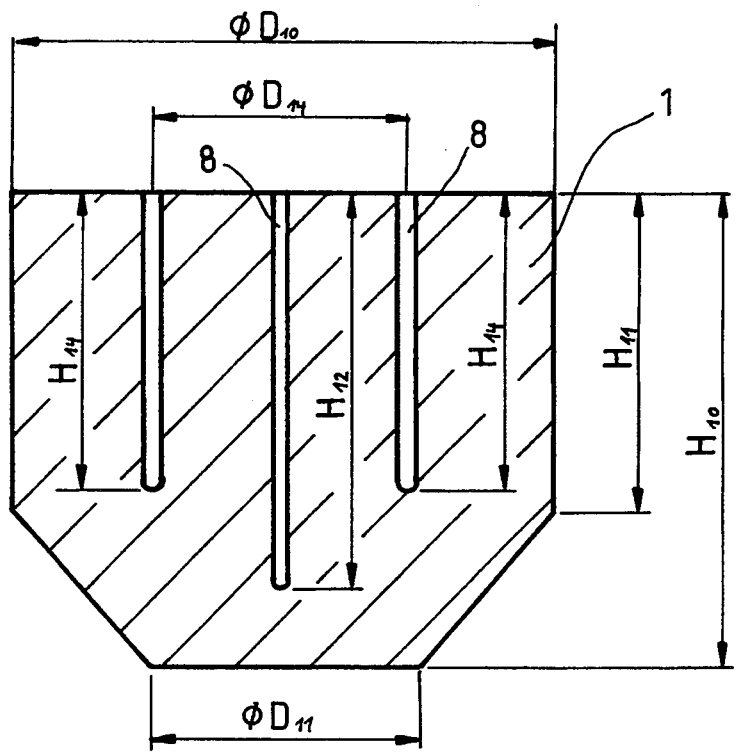

FIG. 3 shows a plunger with a centrally arranged degassing opening 8 and further concentrically arranged degassing openings 8. The size of finally sintered hard alloy body is as follows:

Base Diameter of the Plunger 1

$D_{10}$: 240 mm (approximately 290 mm)

Diameter of the Pressing Surface $D_{11}$: 120 mm (approximately 145 mm)

Total Height $H_{10}$: 180 mm (approximately 215 mm)

Height of the Cylindrical Part $H_{11}$: 100 mm (approximately 120 mm).

In the brackets the size of the press bodies before the presintering is given.

The production of the press bodies is performed by cold isostatic pressing of a WC-Co-powder granulate which contains 1.5% of paraffin wax as granulating and press aiding substance.

Before the presintering the press body is provided with seven openings. The openings have a diameter of 5 mm. The central opening has a depth of $H_{12}=165$ mm. The remaining six openings are distributed uniformly on a circle with $D_{14}=140$ mm and have a depth of $H_{14}=140$ mm. During sintering the size of the openings reduces by approximately 20%. The final sinter body is subsequently ground to the predetermined nominal size. Since the openings in this arrangement have no disadvantages for the use of the sinter body as ultrahigh pressure plunger, they are not worked and not closed.

Figure 4:
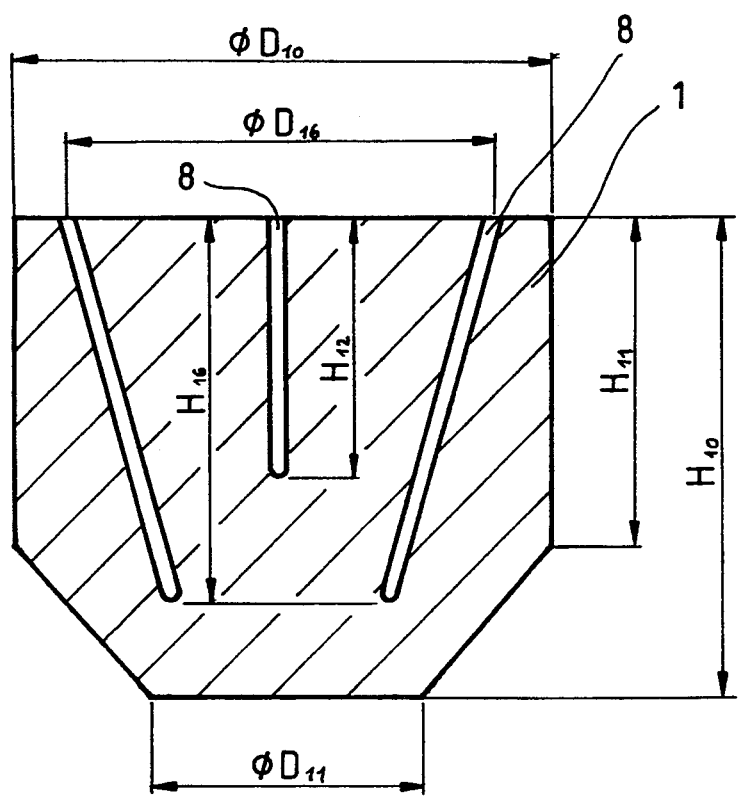

FIG. 4 shows a sinter body in which the outwardly located degassing passages have a greater length or depth $H_{16}$ than the centrally arranged passage with a height $H_{12}$. The outwardly located passages are moreover inclined relative to the axis of the body. They extend from a partial circle with a diameter $D_{16}$ which is greater than the diameter of the partial circle $D_{14}$ in FIG. 3.

Figure 5:
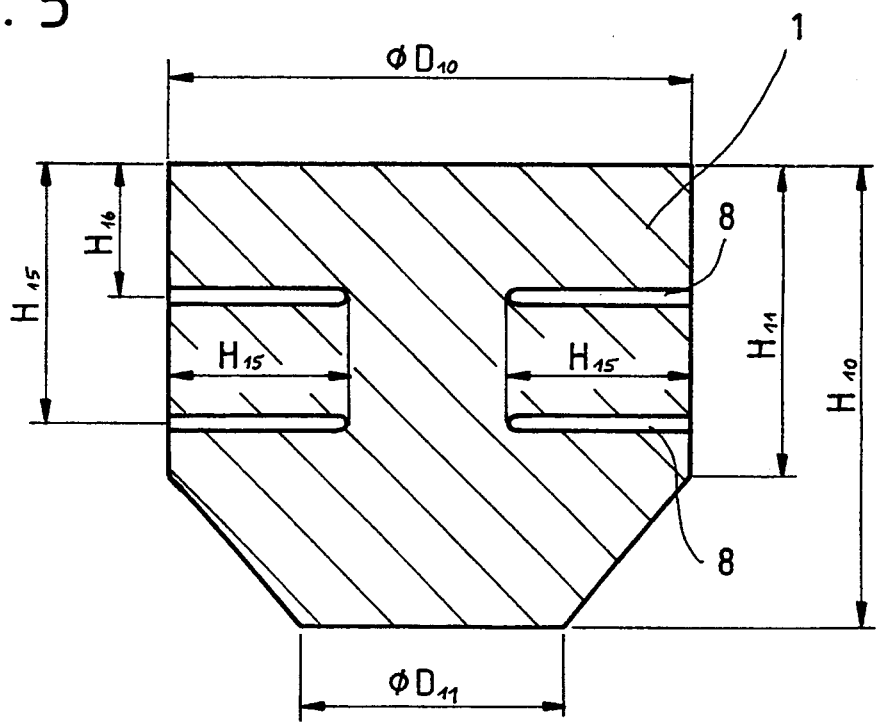

FIG. 5 shows the arrangement for radially extending degassing passages 8. The degassing passages here are located on partial circles which are spaced from one another by distances $H_{15}$ and $H_{16}$ from the upper side of the plunger. It is to be understood that it is of course possible to provide plungers with degassing passages which extend both in a radial direction and in an axial direction.

Figure 6:
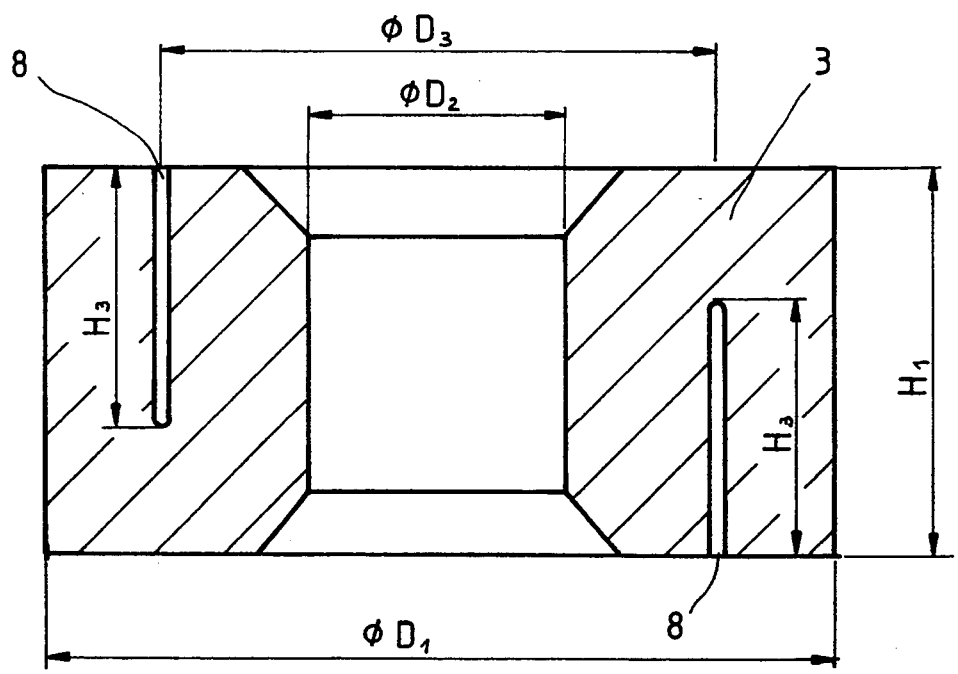
FIGS. 6–11 are views showing matrixes for performing the inventive method in accordance with several embodiments of the present invention.

FIG. 6 shows a matrix 3 in accordance with one embodiment of the present invention which has an outer diameter $D_1$, an inner diameter $D_2$ and degassing openings 8 with a length $H_3$. The degassing openings extend axially from partial circles with a diameter $D_3$. The degassing openings extend correspondingly from the lower side of the matrix upwardly, and from the upper side of the matrix downwardly.

Figure 7:
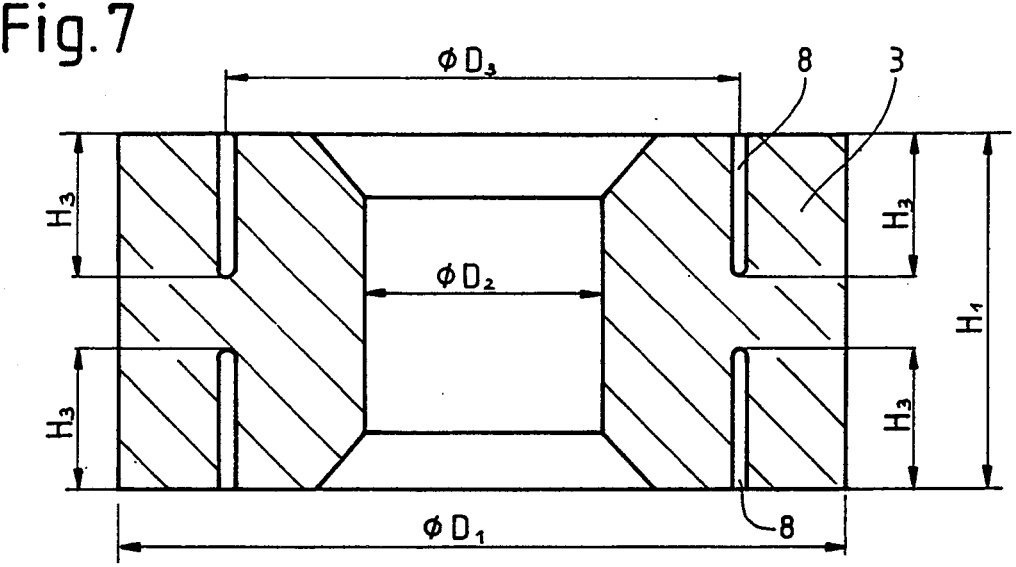

FIG. 7 shows a similar arrangement of the passages in the matrix. Here however the degassing passages 8 are shorter. They also extend opposite to one another in a cross-sectional plane of the matrix.

Figure 8:
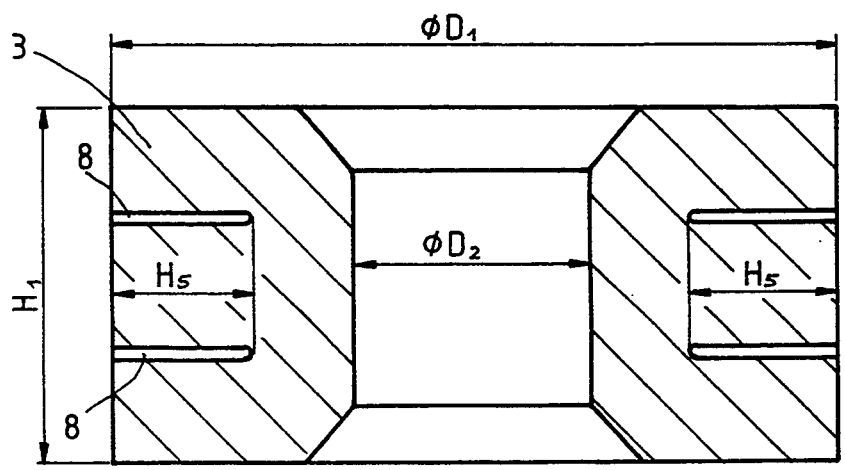

FIG. 8 shows a matrix with radially extending degassing passages 8. The degassing passages are located at different heights in the matrix and on corresponding partial circles spaced from one another.

Figure 9:
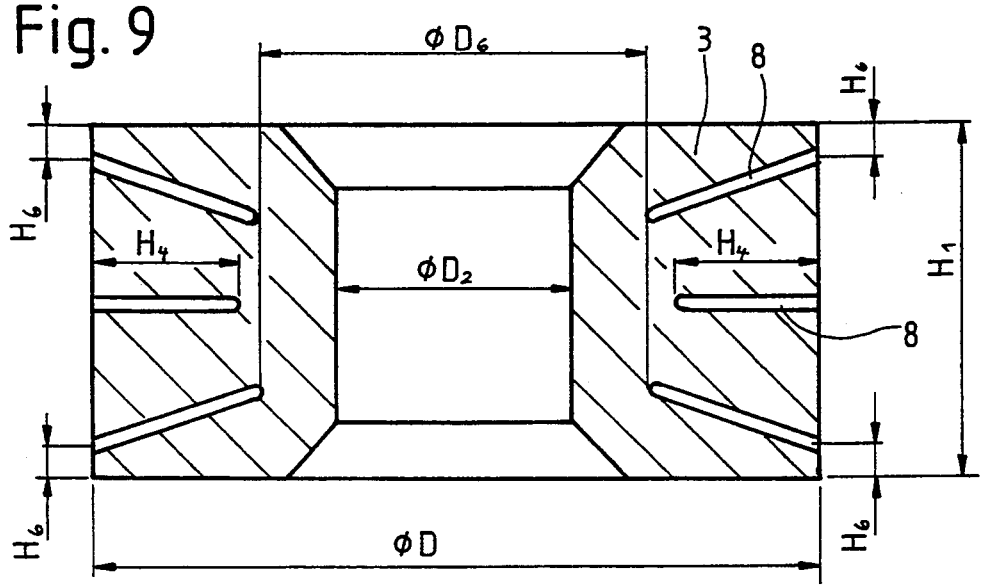

In the matrix in accordance with the embodiment shown in FIG. 9 the degassing passages are partially oriented exactly radially, and partially are inclined in direction to the axis of the matrix or in other words to the wall of the pressing chamber.

Figure 10:
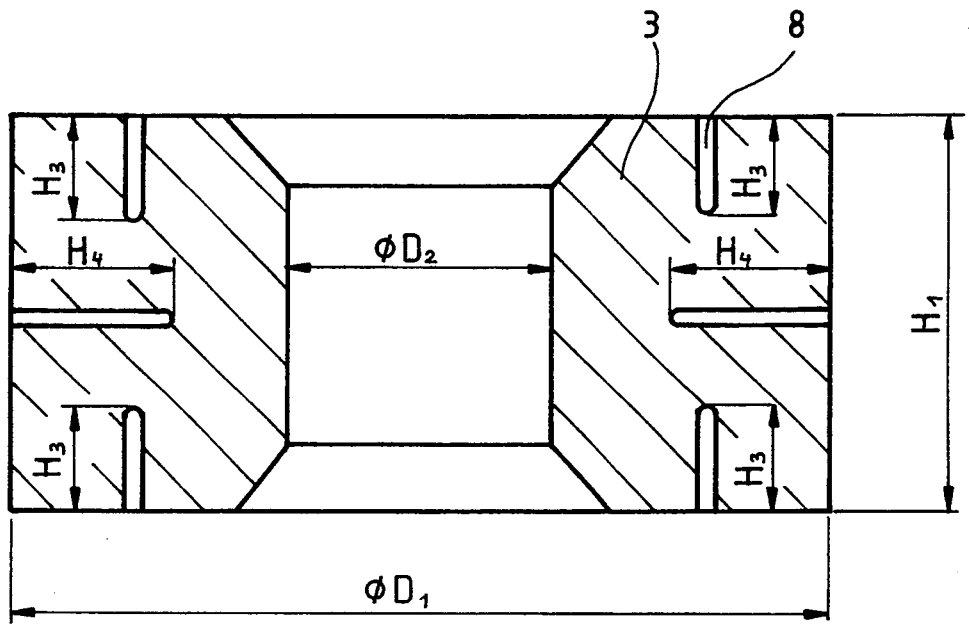

FIG. 10 shows a matrix which is provided both with radial degassing passages and axial degassing passages, in combination.

Figure 11:
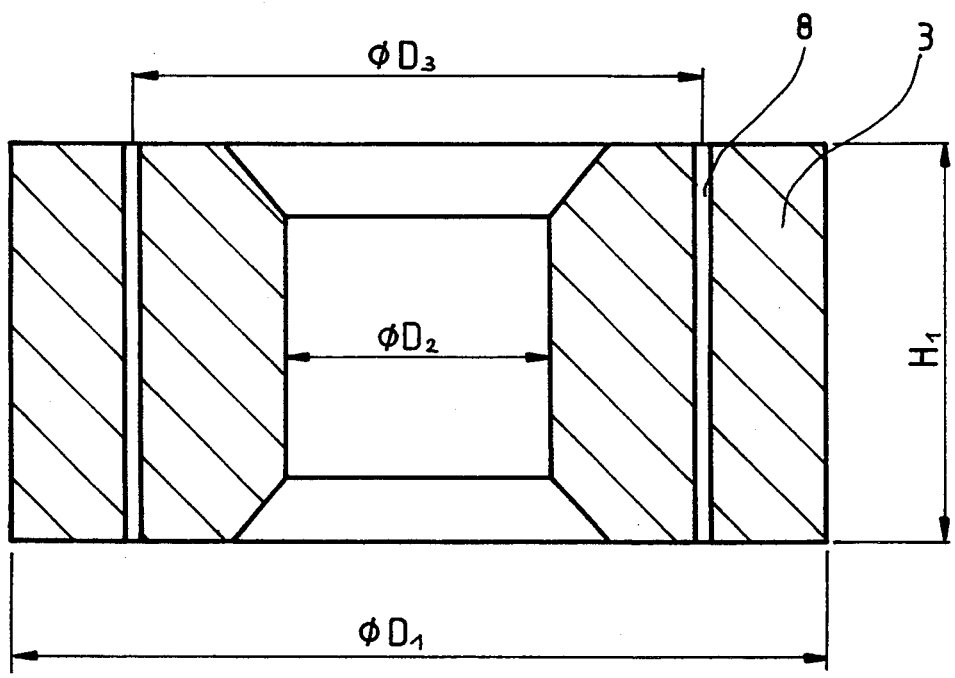

FIG. 11 shows a matrix 3 in accordance with a further embodiment. Here the degassing passages 8 or openings are formed as throughgoing passages extending through the total height of the matrix.

The sizes of the finally sintered hard alloy matrixes or bodies 3 are as follows:

| Outer diameter | $D_1$: | 360 mm (approximately 430 mm) |
|---|---|---|
| Inner diameter | $D_2$: | 230 mm (approximately 145 mm) |
| Height | $H_1$: | 120 mm (approximately 145 mm). |

In the brackets the size of the press body before the presintering is given.

The production of the matrixes or press bodies therefore are performed by cold isostatic pressing of a WC-Co-powder granulate which contains 1.7% paraffin wax as granulating and press aiding material.

Before the presintering the press body is provided with throughgoing openings 8. The openings 8 have a diameter of 6 mm and are uniformly distributed on a circle with a diameter $D_3=300$ mm. After the sintering the diameter of the partial circle is approximately 250 mm.

The finished sinter body is subsequently ground to the predetermined nominal size and used as ultrahigh pressure matrix. The openings are not processed. When the sinter body is used as the ultrahigh pressure matrix, the channels are utilized for supplying a cooling fluid.

It will be understood that each of the elements described above, or two or more together, may also find a useful application in other types of methods differing from the types described above.

While the invention has been illustrated and described as embodied in a method of producing metal sinter bodies and a sinter body produced thereby, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of producing hard alloy sinter bodies which form press tools in form of a plunger and a matrix with regions which are loaded higher and regions which are less loaded during use of the tools, the method comprising the steps of forming a press body; sintering the press body; and providing in the formed press body before said sintering degassing passages located in said less loaded regions and formed as blind openings for degassing the press body during the sintering.

2. A method as defined in claim 1; and further comprising the step of forming in the press body additional degassing passages as throughgoing passages.

3. A hard alloy sinter body which forms press tools including a plunger and a matrix for a pressing apparatus, the hard alloy sinter body comprising a body part having an outer side and a cross-section region which is less loaded and a cross-section region which is loaded higher during use of the tools, said body part having at least one degassing passage which opens on said outer side in said less loaded cross-section region and is formed as a blind opening for degassing the body part during sintering.

4. A hard alloy sinter body as defined in claim 3, wherein said body part has additional degassing passages formed as throughgoing openings.

5. A hard alloy sinter body as defined in claim 3, wherein said degassing passages are formed as axial passages.

6. A hard alloy sinter body as defined in claim 3, wherein said degassing passages are formed as radial passages.

7. A hard alloy sinter body as defined in claim 3, wherein said degassing passages are formed as axial and radial passages.

8. A hard alloy sinter body as defined in claim 3, wherein said body part is a pressing tool and has a lower pressing side and an upper opposite side, said degassing passages extend to aid upper side of said body part.

9. A hard alloy sinter body as defined in claim 3, wherein said body part is formed as a pressing plunger having an upper side and a lower plunger working surface, said body part having only one said degassing passage which is formed as a cross-section region which is less loaded and a cross-section region which is loaded higher during use of the tools opening and extends centrally from said upper side of said body part in direction to said lower plunger working surface.

10. A hard alloy sinter body as defined in claim 3, wherein said body part has a plurality of said degassing passages.

11. A hard alloy sinter body as defined in claim 3, wherein said at least one degassing passage has a diameter of substantially between 2 and 8 mm.

12. A hard alloy sinter body as defined in claim 3, wherein said body part has a plurality of said degassing passages which are arranged on concentric partial circles.

13. A hard alloy sinter body as defined in claim 3, wherein said body part is formed as an ultrahigh pressure plunger with an outer diameter which is greater than 80 mm and a total height which is greater than 60 mm.

14. A hard alloy sinter body as defined in claim 3, wherein said body part is formed as an ultrahigh pressure matrix with an inner diameter which is greater than 40 mm, an outer diameter which is greater than 120 mm, and a total height which is greater than 60 mm.

* * * * *